ent Office 2,978,354
Patented Apr. 4, 1961

2,978,354
METHOD OF APPLYING A COATING
David K. Lesser, P.O. Box 1642, Wilmington, Del.
No Drawing. Filed Mar. 18, 1958, Ser. No. 722,140
7 Claims. (Cl. 117—47)

This invention relates to a method of applying a protective and decorative coating, and, more particularly, relates to a method of applying a low-molecular weight resin as a coating.

It has been found advantageous to apply coatings or films of various low-molecular weight resins to a wide variety of materials and then polymerize them to a high molecular weight to protect and/or decorate the materials. Examples of resins commercially used in such coatings or films are epoxy resins, acrylics, phenol-formaldehydes, and unsaturated polyesters. These resins are cured or polymerized, for example, by the application of heat or a catalyst or both. This curing or polymerization occurs rapidly even at room temperatures if a strong catalyst is mixed into the resin prior to the application of the resin to the base material or substrate.

Since the mixture of resin and a strong catalyst has an extremely short pot life, it gels soon after the catalyst is added to the resin. These mixtures must, therefore, be applied very soon after they are mixed to prevent them from gelling in the apparatus used for applying them to the base material. Batches of resin and catalyst can, therefore, be premixed only in the quantities which are small enough to be almost immediately applied to the substrate.

Various attempts have been made to extend the pot life of the resin-catalyst mixture. One such method is to avoid the use of strong catalysts, but this prolongs the curing period or requires the use of high temperature. Another method is to add inhibiting agents to the mixture which prevent polymerization until the resin is applied as a film. The inhibitor is then evaporated or destroyed by the application of heat after which polymerization proceeds normally. However, this technique is generally unpredictable and difficult to control.

Another method of extending pot life is to use a "catalyst spray gun" which simultaneously sprays the resin and the catalyst on the substrate thereby mixing them in the air on their way to the substrate. However, it is difficult to control the ratio of resin to catalyst, and the spraying equipment is complicated and expensive.

A recently developed technique for applying polyester resins as coatings involves depositing an organic-soluble catalyst in a ground coat upon the substrate before the uncatalyzed polyester is applied. The organic-soluble catalyst is either dissolved alone prior to application in an organic solvent or organic plasticizer, or it is dissolved along with some other material that can form a film upon the substrate when the solvent evaporates. After the catalyst mixture dries, a substantial amount remains upon the surface of the substrate either alone or in a mixture with modifying agents. Even though the solvent has evaporated, a ground coat that can be seen and felt remains upon the surface of the substrate. When a nonair-inhibited polyester is applied over this substantial ground coat, it, therefore, combines with it and starts polymerizing almost immediately which avoids most of the problems resulting from the short pot life of the resin and catalyst mixtures. However, substantial ground coats of this type have been successfully applied only with organic-soluble catalysts which are usually rather weak and require prolonged curing periods or exposure to elevated temperatures during curing. Furthermore, these organic-soluble catalysts are unstable particularly when these storing temperatures cannot be maintained sufficiently depressed. Moreover, these organic-soluble catalysts are expensive, difficult to manufacture, and not readily available. Still further, even when their expense and necessity for care in handling and applying are tolerated, the results achieved tend to be unpredictable.

An object of this invention is to provide a simple and reliable method of applying a low-molecular weight resin as a coating which utilizes inexpensive and readily available catalysts and provides rapid curing at normal room temperatures to produce coatings of good physical properties.

In accordance with this invention, a water-soluble catalyst is applied to the substrate in an aqueous solution. In spite of the fact that these water-soluble catalysts apparently disappear for all practical purposes as soon as their solvent evaporates, it has been unexpectedly discovered that enough of their effect remains upon the substrate to quickly cure at normal room temperatures coatings of uncatalyzed resin which are applied over them. This is true even though there is not enough of the catalyst present to be seen or felt.

Suitable wetting agents are mixed into the aqueous solutions to make them spread smoothly over the substrate. Excellent surface coatings are formed in this manner even though it would appear that these aqueous solutions would be immiscible with the organic-soluble resins to which they are applied. Furthermore, thicker coatings of appreciable depth and superior adherence are formed by applying a coating of uncatalyzed resin over the apparently consumed and vanished layer of water-soluble catalyst. However, in some unexplainable manner, enough of the effect of the catalyst remains to polymerize or cure the coating in a tough adherent coating to form a relatively thick and tough protective coating which is securely anchored to and even beneath the surface of the substrate.

The following is a flow diagram describing the steps of the aforementioned method:

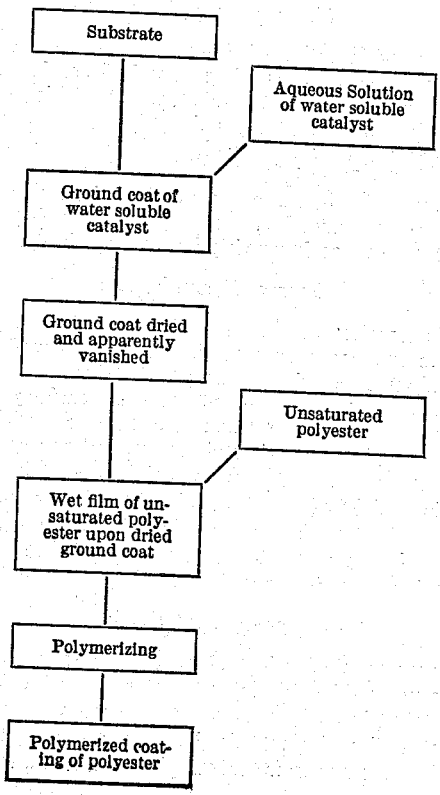

Water soluble catalysts have many desirable properties including stability in storage, relative cheapness and ready availability. In spite of these advantages, most of the water-soluble catalysts are only about 1/10 to 1/20 as expensive as corresponding organic-soluble catalysts. For example, the cost of some representative water-soluble catalysts is approximately 15 cents per pound in comparison to the three dollars per pound approximate cost of corresponding organic-soluble catalysts. Moreover, these water-soluble catalysts cure or polymerize at rates which are approximately 3 times as fast at normal room temperatures as the curing rates of organic-soluble catalysts.

The following is a table showing examples of several catalysts that can be used for curing coating resins.

TABLE A

| Type Resin | Catalyst |
| --- | --- |
| Unsaturated polyester | Hydrogen peroxide. Sodium hypochlorite. Boron fluoride. Boron chloride. Aluminum chloride. Sodium persulfate. |

The following general techniques have been successfully practiced in utilizing water-soluble catalysts for polymerizing unsaturated polyesters.

*General Example I*

Thirty percent hydrogen peroxide is applied as a thin film on a nonabsorbent substrate, for example, linoleum, and allowed to dry until it disappears completely and leaves the linoleum dry and uncoated as far as sight and touch can detect. An uncatalyzed polyester which is not air inhibited is then applied to the substrate. Surprisingly enough, the resin begins to immediately polymerize on contact with the substrate to form a hard, tough coating even though there was no apparent trace of the catalyst present upon the linoleum.

*General Example II*

If the water solution of the catalyst is too strong, or if it does not evaporate rapidly enough, it can be thinned with a water-miscible organic solvent. This mixture may range widely from approximately 2 parts by weight of catalyst to 98 parts by weight of solvent to approximately 2 parts by weight of solvent to 98 parts by weight of catalyst. Furthermore, the addition of certain organic solvents may further increase the handling safety of the catalyst as well as improving its wetting ability.

*General Example III*

If the catalyst coating is to be applied to a porous substrate such as fiberboard, it can be thickened before application to retard its penetration. Conventional water thickeners such as methyl cellulose, carboxy methyl cellulose, locust bean extract, etc., may be used in proportions varying approximately from 0.001 part by weight of thickener with 99 parts by weight of catalyst to 50 parts by weight of thickener with 50 parts by weight of catalyst. Water-miscible organic solvents may also be included in the catalyst and thickener mixture to speed the drying time, improve compatibility and solubility.

*General Example IV*

The water solution including the catalyst can be mixed with a water-thinnable latex to retard the penetration of the catalyst into a porous substrate, such as wood. The dry latex film also retards the penetration of the polyester into the substrate. Examples of such water-thinnable latexes are polyvinyl acetate, acrylic, isobutylene-styrene, etc. From about 1 part by weight of catalyst with 99 parts by weight of latex to about 1 part by weight of latex with 99 parts by weight of catalyst may be used. Organic plasticizers and solvents may also be added to the catalyst-latex mixture.

*General Example V*

The catalyst may be mixed with water-soluble film formers such as water glass, animal glue, polyvinyl alcohol, casein, etc., to provide films which retard the penetration of catalyst and resin into porous substrates.

*General Example VI*

The aqueous phase of an emulsion whether it is continuous or discontinuous may be intermixed with the catalyst to provide films which retard penetration into the substrate. Such emulsions are, for example, nitrocellulose, shellac, resin, etc.

*General Example VII*

Organic solvent solutions of film formers which tolerate a substantial percentage of water even though they are not completely water-soluble can also be mixed into the catalyst to retard penetration into the substrate. Some of these materials are, for example, ethylcellulose, polyvinyl butyral, soluble nylon, etc. Approximately from 1 part of catalyst by weight with 99 parts of film former solution to 75 parts by weight of catalyst with 20 parts by weight of the film former solution may be utilized.

Somewhat similar methods of application may be utilized to induce polymerization when the aqueous catalyst is applied over an uncatalyzed film of resin, for example, polyester, instead of under the uncatalyzed resin film. Three-coat systems, including a first coat of uncatalyzed polyester, a second coat of water-soluble catalyst and a third coat of uncatalyzed polyester have been also found to rapidly polymerize into an extremely hard and durable coating.

Specific coating thicknesses and drying times of the water-soluble reactive ground coats are difficult to specify because these factors are influenced by the type of catalyst, its concentration, reactivity of the corresponding resin, and the curing temperature. However, with a water-soluble catalyst consisting of 5 parts by weight of 30% hydrogen peroxide and 10 parts by weight of polyvinyl acetate, for example, Polyco 117-SS made by the Borden Company, the wet film thickness of the reactive ground coat should be approximately one-half to two-thirds of the total thickness of a polyester top coat. When this type of ground coat is applied to fir plywood, it dries and is in condition ready to initiate polymerization of a polyester top coat in as little as 15 minutes at room temperature. In spite of the fact that the hydrogen peroxide apparently vanishes after drying, the ground coat remains in condition for reaction with a resin top coat for as long as approximately 3 days if maintained somewhere near normal room temperatures.

Although all of the reasons for the potency of these invisible and apparently non-existent catalysts are not completely understood, it is believed that there are enough of the polymerizing free radicals remaining upon the substrate to initiate polymerization of the later deposited resin coating, even though they cannot be seen or felt.

Various examples of coatings formed by specific water-soluble catalyst ground coats and resins as applied to specific substrates are given in the following to demonstrate how this technique is carried out for coating many different kinds of materials.

Specific Example 1

Substrate—linoleum
Groundcoat—30% hydrogen peroxide (acid stabilized)
Brush ½ mil wet film, air dry ½ hour.

TOP COAT

| Manufacturer | Designation | Constituents | Parts by Weight or Volume |
|---|---|---|---|
| Amer. Cyanamid | Laminac 4110-4-6 | Unsaturated Polyester. | 7.6 |
| Dow | Styrene PL-12-T | styrene monomer. | 1.2 |
| Advance | | 6% Cobalt Naphthanate. | 0.06 |

Application Procedure—Brush one mil wet film, air dry overnight at room temperature.

Specific Example 2

Substrate—sanded Fir plywood

FIRST COAT

| Manufacturer | Designation | Constituents | Parts by Volume |
|---|---|---|---|
| Reichold | Polylite 8037 | unsaturated polyester. | 5 |
| Dow | Styrene PL-12-T | styrene monomer. | 5 |

Application Procedure—Spray one mil wet film, and allow it to penetrate into the wood.

SECOND COAT

| Constituents | Parts by Volume |
|---|---|
| 50% hydrogen peroxide | 5 |
| Ethyl acetate | 15 |

Application Procedure—Brush 1 mil wet film and allow to dry at room temperature for ½ hour.

TOP COAT

| Manufacturer | Designation | Constituents | Parts by Volume |
|---|---|---|---|
| Reichold | Polylite 8037 | unsaturated polyester. | 45 |
| Dow | | styrene monomer. | 15 |

Application Procedure—Spray two mil wet film and dry overnight at room temperature. This system forms a hard coating which sands easily. The grain of the plywood does not show through the finish.

Specific Example 3

Substrate—sanded walnut

REACTIVE GROUNDCOAT

| Manufacturer | Designation | Constituents | Parts by Volume |
|---|---|---|---|
| Borden | Polyco 117-SS | vinyl acetate latex | 20 |
| | | 35% hydrogen peroxide | 15 |
| | | Van Dyke brown pigment (dispersed). | ½ |

Application Procedure—Spray one mil wet film, air dry one hour at room temperature. Scuff sand with 360 paper.

TOP COAT

| Manufacturer | Designation | Constituents | Parts by Volume |
|---|---|---|---|
| BASF | Plastopal P-6 | unsaturated polyester. | 100 |
| Dow | Styrene PL-12-T | styrene monomer. | 20 |
| | | cobalt solution [1] | 3 |
| | | paraffin wax (55° C. melting point).[2] | 0.1 |

[1] 10 parts 11% cobalt naphthanate; 90 parts styrene PL-12-T.
[2] Heat to dissolve.
Application Procedure—Spray two mil wet film, force dry 3 hours at 120° F. The coating forms a hard, dull film which sands easily and buffs to a high gloss. The pores of the walnut were filled by this system and no separate filling operation was required.

Specific Example 4

Substrate—cork floor tile

GROUNDCOAT

| Manufacturer | Designation | Constituents | Parts by Weight or Volume |
|---|---|---|---|
| Dow | Methylcel, 400 cp. | sodium hypochlorite. | 5 |
| | | methylcellulose | ½ |
| | | water | 95 |

Application Procedure—Knifecoat one mil wet film, dry two hours at room temperature.

TOP COAT

| Manufacturer | Designation | Constituents | Parts by Volume |
|---|---|---|---|
| Celanese | Marco Resin MR-28-C | rigid polyester | 30 |
| Celanese | Marco Resin MR-30-C | flexible polyester | 15 |
| Dow | Styrene PL-12-T | styrene monomer | 15 |
| Dow Corning | | paraffin solution [1] | ½ |
| | | silicone solution [2] | 1 |
| | | cobalt solution [3] | 1 |

[1] 20 parts paraffin wax, melting point 55° C.; 80 parts styrene monomer.
[2] ½ part Dow Corning DC-200 fluid 100 cps. viscosity; 100 parts styrene monomer.
[3] 18.4 parts 6% cobalt naphthanate; 81.6 parts styrene monomer.
Application Procedure—Knifecoat 3 mil wet film, air dry at room temperature overnight.

Specific Example 5

Substrate—cement blocks

GROUNDCOAT

| Manufacturer | Designation | Constituents | Parts by Weight or Volume |
|---|---|---|---|
| Hayden | | boron fluoride (saturated solution). | 10 |
| Bakelite | | polyvinyl alcohol | 10 |

Application Procedure—Brush ½ mil wet film, air dry ½ hour at room temperature.

TOP COAT

| Manufacturer | Designation | Constituents | Parts by Volume |
|---|---|---|---|
| U.S. Rubber | Vibrin 117 | unsaturated polyester. | 100 |
| Dow | Styrene PL-12-T | styrene monomer | 20 |
| | Titanium Dioxide Rutile.[1] | White pigment | 25 |
| | | cobalt solution [2] | 1 |
| | | paraffin solution [3] | ½ |

[1] The pigment can be stirred into the polyester without resorting to the conventional dispersion techniques.
[2] See footnote #1, Example 3.
[3] See footnote #1, Example 4.
Application Procedure—Brush two mil wet film. Air dry at temperature above 60° F.

Various examples of rather amazing results achieved with this technique in comparison to the results available by previously practiced methods and their more expensive and unstable catalysts are discussed in the following:

Unusual and decorative effects can be obtained with some woods like Douglas Fir, spruce and pine which have a hard and soft grain by applying a 35% hydrogen peroxide. The water makes the soft springwood expand but does not affect the hard summerwood. When the wood has dried, the grain remains uneven, and a polyester top coat holds the unevenness of the grain indefinitely.

Most finishes for furniture are rubbed and polished to provide a smooth even appearance and to bring out the grain. It is usually necessary to allow the furniture to stand overnight at room temperature or about five hours at 120° F. before the finish is hard enough to rub and polish, and to minimize after-shrinkage. With conventionally catalyzed polyesters it is possible to rub and polish in about four hours at room temperature. With this invention it is possible to rub and polish in one hour or less.

One of the problems with polyesters is the fact that they run easily when applied to a vertical surface. Most polyesters cannot be hot sprayed because it would reduce the pot life to almost nothing. However, with this invention the polyester can be hot sprayed with no fear of gelling, and you eliminate much of the problem of spraying on a vertical surface. Furthermore, with conventional polyesters where a catalyst is added before spraying, it is impossible to collect the overspray because it would gel before it could be reused. With this invention the overspray can be collected and used again.

What is claimed is:

1. A method of applying a polymerized coating of an unsaturated polyester upon a substrate which comprises the steps of applying a ground coat essentially consisting of an aqueous solution of hydrogen peroxide to said substrate, drying said ground coat, and applying said unsaturated polyester over said dried ground coat to rapidly cure said unsaturated polyester and form a polymerized coating over said substrate.

2. A method as set forth in claim 1 wherein a water miscible organic solvent is mixed into said aqueous solution of hydrogen peroxide to enhance its ability to spread over the substrate and to decrease the drying time.

3. A method as set forth in claim 1 wherein suitable water soluble thickeners are mixed into said aqueous solution of hydrogen peroxide to retard its penetration into said substrate.

4. A method as set forth in claim 1 wherein said aqueous solution of hydrogen peroxide is mixed with suitable water soluble film formers to retard its penetration into said substrate.

5. A method as set forth in claim 1 wherein said aqueous solution of hydrogen peroxide is mixed into the aqueous phase of an emulsion which retards its penetration into said substrate.

6. A method as set forth in claim 1 wherein said aqueous solution of hydrogen peroxide is mixed with an organic solvent solution of an organic solvent soluble film former which tolerates dissolved water over and above that required to dissolve said organic solvent soluble film former to retard its penetration into the substrate.

7. A method as set forth in claim 1 wherein said aqueous solution of hydrogen peroxide is applied to said substrate and allowed to dry, said substrate then being sanded and cleaned, and said unsaturated polyester being applied over said sanded and dried coating formed by said aqueous solution of hydrogen peroxide.

References Cited in the file of this patent

UNITED STATES PATENTS

| | | |
|---|---|---|
| 2,123,152 | Rivat | July 5, 1938 |
| 2,235,141 | Dreyfus et al. | Mar. 18, 1941 |
| 2,424,284 | Olpin | July 22, 1947 |
| 2,440,318 | White et al. | Apr. 27, 1948 |
| 2,515,340 | Fisher et al. | July 18, 1950 |
| 2,529,315 | Serniuk | Nov. 7, 1950 |
| 2,533,557 | Chapman | Dec. 12, 1950 |
| 2,599,943 | Russel | June 10, 1952 |
| 2,632,715 | Nadeau et al. | Mar. 24, 1953 |
| 2,684,305 | Quinlivan | July 20, 1954 |
| 2,704,753 | Nonoghan | Mar. 22, 1955 |
| 2,756,164 | Fisher | July 24, 1956 |
| 2,823,147 | Upperman | Feb. 11, 1958 |
| 2,930,106 | Wrotnowski | Mar. 29, 1960 |

Notice of Adverse Decision in Interference

In Interference No. 92,394 involving Patent No. 2,978,354, D. K. Lesser, Method of applying a coating, final judgment adverse to the patentee was rendered June 13, 1963, as to claims 1, 2, 5, 6 and 7.

[*Official Gazette February 4, 1964.*]